(12) United States Patent
Mai et al.

(10) Patent No.: US 9,178,390 B2
(45) Date of Patent: Nov. 3, 2015

(54) MOTOR AND COIL STRUCTURE THEREOF

(75) Inventors: Sheng-En Mai, Taoyuan Hsien (TW);
Chia-Hung Hsu, Taoyuan Hsien (TW);
Yen-Chun Huang, Taoyuan Hsien (TW)

(73) Assignee: DELTA ELECTRONICS, INC., Kuei San, Taoyuan Hsien (TW)

( * ) Notice: Subject to any disclaimer, the term of this patent is extended or adjusted under 35 U.S.C. 154(b) by 337 days.

(21) Appl. No.: 13/598,231

(22) Filed: Aug. 29, 2012

(65) Prior Publication Data

US 2013/0147305 A1 Jun. 13, 2013

(30) Foreign Application Priority Data

Dec. 7, 2011 (TW) .............................. 100145166 A

(51) Int. Cl.
*H02K 3/47* (2006.01)
*H02K 1/02* (2006.01)
*H02K 1/14* (2006.01)

(52) U.S. Cl.
CPC .. *H02K 1/02* (2013.01); *H02K 1/14* (2013.01); *H02K 3/47* (2013.01)

(58) Field of Classification Search
CPC ... H02K 3/47; H02K 15/0492; H02K 15/061; H02K 3/04; H02K 3/28
USPC .......................................... 310/216.002, 208
See application file for complete search history.

(56) References Cited

U.S. PATENT DOCUMENTS

| | | | | |
|---|---|---|---|---|
| 3,360,668 A | * | 12/1967 | Faulhaber | 310/195 |
| 4,331,896 A | * | 5/1982 | Sedgewick | 310/179 |
| 4,373,148 A | * | 2/1983 | Gutz | 318/400.41 |
| 5,821,660 A | * | 10/1998 | Anderson | 310/184 |
| 6,320,290 B1 | * | 11/2001 | Kanebako et al. | 310/90.5 |
| 2006/0108886 A1 | * | 5/2006 | Kehr et al. | 310/103 |
| 2006/0238058 A1 | * | 10/2006 | Koide et al. | 310/156.55 |
| 2007/0138897 A1 | * | 6/2007 | Asaba et al. | 310/208 |
| 2009/0072651 A1 | * | 3/2009 | Yan et al. | 310/179 |
| 2011/0133591 A1 | * | 6/2011 | Yan et al. | 310/177 |

FOREIGN PATENT DOCUMENTS

JP 04049831 A * 2/1992 ............. H02K 7/065

OTHER PUBLICATIONS

Narita et al.,Translation of JP04049831A, Feb. 1992.*

* cited by examiner

*Primary Examiner* — Michael Andrews
*Assistant Examiner* — Eric Johnson
(74) *Attorney, Agent, or Firm* — Muncy, Geissler, Olds & Lowe, P.C.

(57) ABSTRACT

A motor comprises a coil structure and a plurality of magnetic materials. The coil structure includes three winding groups, each of which has a plurality of winding portions. The winding portions have an interval therebetween, and are electrically connected by a wire. The magnetic materials are disposed adjacent to the coil structure and corresponding to the winding groups. Accordingly, the motor has more magnetic materials within the same bending angle of the enameled wire, so that the motor can output larger torsion and power to enhance the motor efficiency.

11 Claims, 10 Drawing Sheets

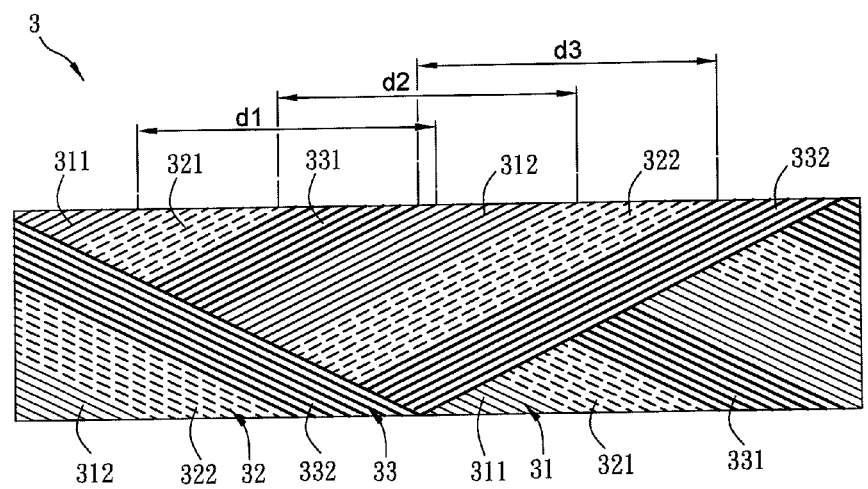
FIG. 2B(1)
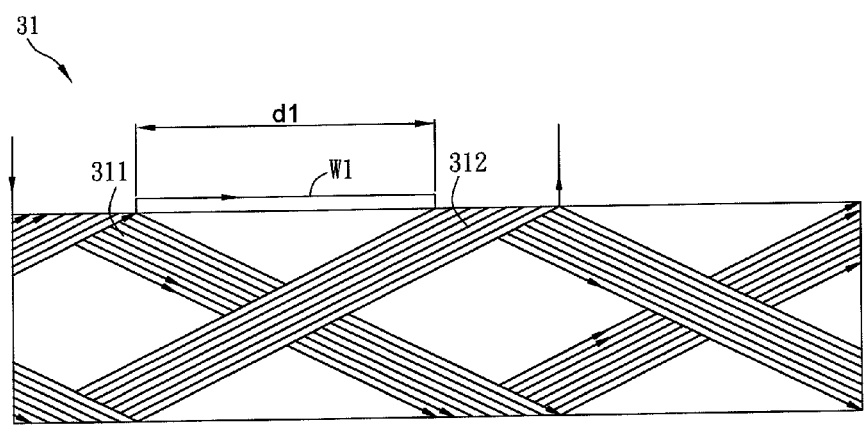
FIG. 2B(2)

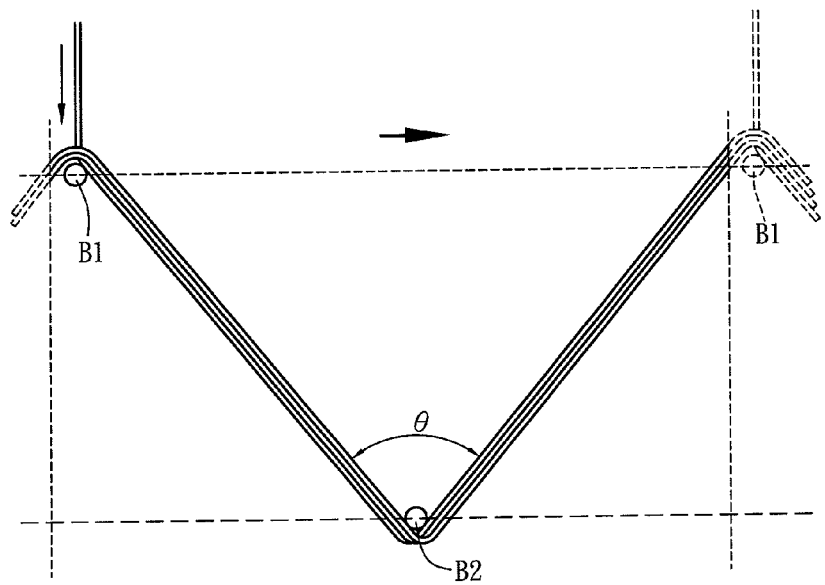
FIG. 2B(3)
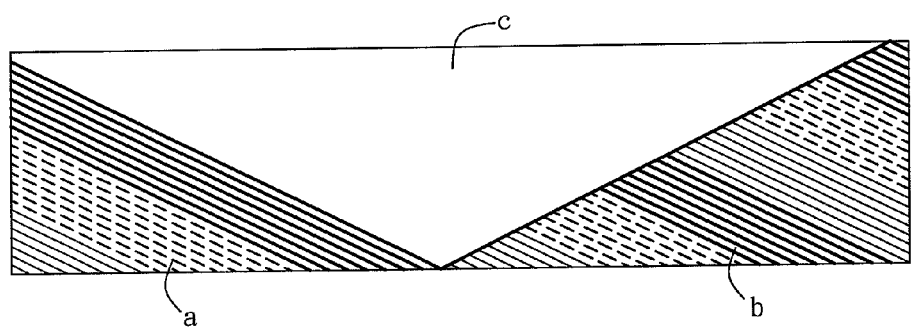
FIG. 2B(4)

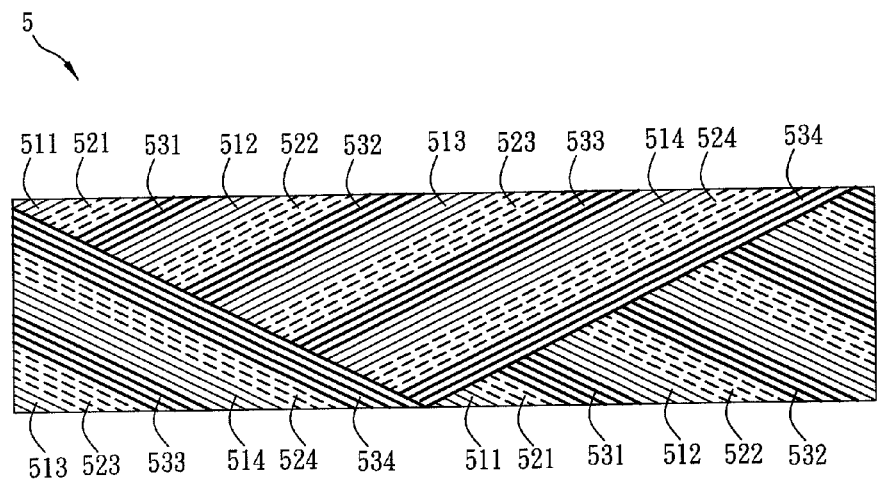
FIG. 4A(1)
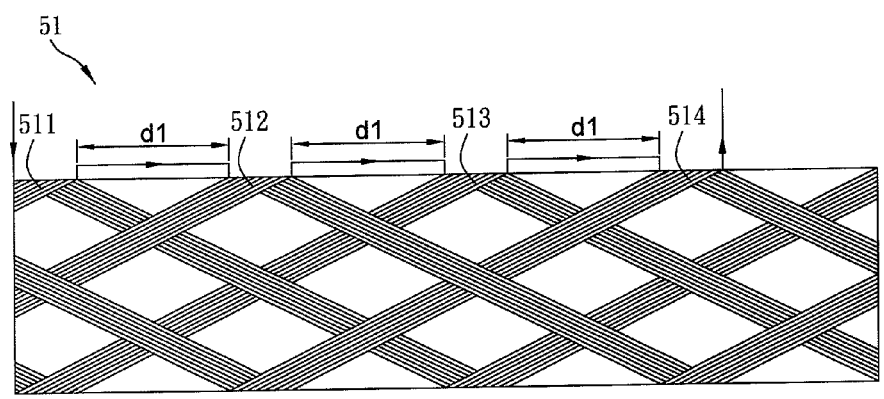
FIG. 4A(2)

MOTOR AND COIL STRUCTURE THEREOF

CROSS REFERENCE TO RELATED APPLICATIONS

This Non-provisional application claims priority under 35 U.S.C. §119(a) on Patent Application No(s). 100145166 filed in Republic of China on Dec. 7, 2011, the entire contents of which are hereby incorporated by reference.

BACKGROUND OF THE INVENTION

1. Field of Invention

The invention relates to a motor and a coil structure thereof and, in particular, to a motor and a coil structure of the FaulHaber winding type.

2. Related Art

Motors are commonly used devices for converting electricity into mechanical energy, thus applied to various kinds of machines such as fans, CD-ROM drivers, hard disk drivers, optical devices, or car devices. There are various kinds of the motor, and they principally function by the electromagnetic effect.

In general, the motor has a magnet as a rotor, and a coil structure as a stator, and can be divided into an external-rotor type and an internal-rotor type in structure. For the external-rotor type, the permanent magnet of the motor is disposed at the outside of the coil stator.

The hollow coil of the present DC motor (regardless of the brushless type or the brushed type) is formed by winding the enameled wire to the hollow circular shape without any permeance iron core been covered by the enameled wire. There are many winding types for a hollow coil, winding types such as hexagon winding, bell-type winding, or diamond winding. FIG. 1A shows a coil 1 with the FaulHaber winding type, in which the enameled wire is bent to conduct the winding, and from appearance the main characteristic of the coil 1 is winding towards the diagonal direction.

As shown in FIG. 1B, the coil 1 is unfolded, including a triangle and an inverted triangle to form a triangle pair (the areas a and b constitute a triangle, and the area c is an inverted triangle, so that a triangle pair is formed). For the coil 1, the triangle portion provides the positive exciting, and the inverted triangle portion provides the negative exciting, thereby rotating the rotor by the switch driving of the circuit. The DC motor presently produced by the industry has a triangle pair (as shown in FIG. 1B) or two triangle pairs (as shown in FIG. 1C, the areas d and e constitute a triangle, and the areas f, g, and h are respectively a triangle, all of which constitute two triangle pairs). Besides, as shown in FIG. 1D, when the hollow coil of the motor has a triangle pair, it can only cooperate with one magnet pair (e.g. with a pair of N-pole and S-pole). When the hollow coil of the motor has two triangle pairs, it can cooperate with two magnet pairs (e.g. four poles, not shown in FIG. 1D). In other words, the number of the magnets is two times the number of the triangle pair.

If the motor will provide more torsion or produce more power with the same motor volume, it needs to cooperate with more magnet pairs, and thus the FaulHaber winding type needs to produce more triangle pairs. To form more triangle pairs, the enameled wire needs to be bent more times, but this will result in the smaller angle θ. The smaller angle θ indicates the enameled wire is bent more greatly, and this will cause the crack to the bent portion of the coil. Consequently, some problems such as the current leakage, less insulation, or lack of pressure resistance will occur to the coil.

Therefore, it is an important subject to provide a motor and a coil structure thereof that can have more magnetic materials with the same bending angle, so that the motor can output larger torsion and power to enhance the motor efficiency.

SUMMARY OF THE INVENTION

In view of the foregoing subject, an objective of the invention is to provide a motor and a coil structure thereof that can have more magnetic materials with the same bending angle, so that the motor can output larger torsion and power to enhance the motor efficiency.

To achieve the above objective, the present invention discloses a motor which comprises a coil structure and a plurality of magnetic materials. The coil structure includes three winding groups, each of which has a plurality of winding portions. The winding portions have an interval therebetween, and are electrically connected by a wire. The magnetic materials are disposed adjacent to the coil structure and corresponding to the winding groups. The coil structure can be a hollow coil, and is formed by the FaulHaber winding method. The winding groups are formed sequentially, and they have the same winding procedure and structure. An end of each of the winding groups is electrically connected to a power source, and the other ends of the winding groups are electrically connected with each other.

In one embodiment, the coil structure has at least one triangular pair of a first number, each of the winding groups has the winding portions of a second number, and the number of the magnetic materials equals to the product of two times the first number and the square of the second number.

In one embodiment, the motor can further comprise a first permeance material, which is disposed in the coil structure and connected with the coil structure. Besides, the motor can further comprise a second permeance material, which is disposed around a periphery of the magnetic materials.

To achieve the above objective, the present invention discloses a coil structure, which comprises a plurality of winding groups. Each of the winding groups has a plurality of winding portions. The winding portions have an interval therebetween, and are electrically connected by a wire. The coil structure can be a hollow coil, and is formed by the FaulHaber winding method. The winding groups are formed sequentially, and they have the same winding procedure and structure.

As mentioned above, the motor according to the invention has a coil structure and a plurality of magnetic materials. The coil structure has three winding groups, each of which has a plurality of winding portions. The winding portions have an interval therebetween, and are electrically connected by a wire. Besides, the magnetic materials are disposed adjacent to the coil structure and corresponding to the winding groups. Accordingly, compared with the prior art, the coil structure of the invention has at least one triangle pair as many as the prior art, and thus the bending angle of the winding is the same as the prior art. However, the motor of the invention has more magnetic materials (permanent magnet) with the same bending angle of the enameled wire, so that the density of the magnetic field lines is higher and the effectiveness thereof is also enhanced. Therefore, with the same motor volume, the motor of the invention can output more torsion and power to enhance the motor efficiency.

BRIEF DESCRIPTION OF THE DRAWINGS

The invention will become more fully understood from the detailed description and accompanying drawings, which are given for illustration only, and thus are not limitative of the present invention, and wherein:

FIG. 2B(1) is a schematic diagram of the unfolded state of the coil structure as shown in FIG. 2A;

FIG. 2B(2) is a schematic diagram of the winding group 31 as shown in FIG. 2A;

FIG. 2B(3) is a schematic diagram of the winding of the coil structure in FIG. 2A;

FIG. 2B(4) is a schematic unfolded diagram of the coil structure in FIG. 2B(1), wherein some oblique lines are removed;

FIGS. 4A(1) and 4A(2) are respectively schematic unfolded diagrams of a motor and a coil structure thereof according to another preferred embodiment of the invention.

DETAILED DESCRIPTION OF THE INVENTION

The present invention will be apparent from the following detailed description, which proceeds with reference to the accompanying drawings, wherein the same references relate to the same elements.

Figure 2A:
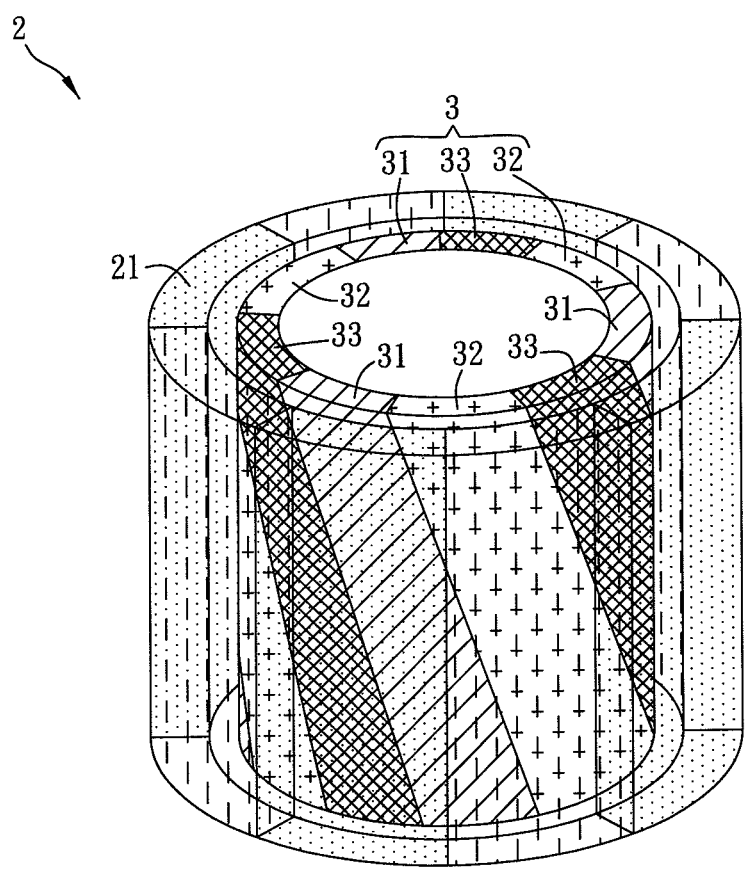
FIG. 2A is a schematic diagram of a motor of a preferred embodiment of the invention.

FIG. 2A is a schematic diagram of a motor 2 according to a preferred embodiment of the invention. The motor 2 can be a three-phase motor, or become a direct current (DC) motor by changing the phase of the current. The motor 2 can be an external-rotor motor, or an internal-rotor motor. Here the motor 2 is an external-rotor motor for example, but it can be an internal-rotor motor in other embodiments. The motor 2 is not limited in shape in the invention. According to different function or application, the motor 2 can be adjusted in structure. The motor 2 includes a coil structure 3 and a plurality of magnetic materials 21.

The coil structure 3 acts as a coil stator of the motor 2, and has three winding groups 31 to 33. The winding groups 31 to 33 are averagely arranged to 360 degrees, forming a hollow coil. Besides, the coil structure 3 doesn't wind through any permeance material (such as a silicon steel sheet). Herein, the winding groups 31 to 33 of the coil structure 3 are formed by the FaulHaber winding type to become the hollow coil. Besides, the winding groups 31 to 33 are sequentially formed by winding towards to the diagonal direction. The winding groups 31 to 33 have the same winding procedure and structure.

FIG. 2B(1) is a schematic diagram of the unfolded state of the coil structure 3 as shown in FIG. 2A. FIG. 2B(2) is a schematic diagram of the winding group 31 as shown in FIG. 2A. Please refer to FIG. 2B(1) and FIG. 2B(2) for the clear illustration of the coil structure 3.

Each of the winding group 31 to 33 has a plurality of winding portions, and the winding portions of the winding group 31 to 33 have an interval therebetween. In the embodiment, the winding groups 31 to 33 respectively have two winding portions 311 and 312, 321 and 322, 331 and 332. The winding portions 311 and 312 have an interval d1, the winding portions 321 and 322 have an interval d2, and the winding portions 331 and 332 have an interval d3.

As shown in FIG. 2B(3), a winding method of the winding group 31 is illustrated as below. During the winding of the winding portion 311, the enameled wire winds through a turning post B1, and then goes on diagonally towards the bottom right direction, and winds through the bottom of another turning post B2, and then proceeds towards the upper right direction. Because the winding portion 311 of the winding group 31 takes some radians, it will wind through the turning post B1 at the upper left, and then proceeds diagonally to wind through the bottom of the turning post B2, and goes on in circles. Finally, the winding portion 311 can be obtained by removing the turning posts B1 and B2. Consequently, the winding group 311 has an angle θ at a bent portion thereof.

By the similar winding method, the winding portion 312 of the winding group 31 can be formed with an interval d1 between the winding portions 311 and 312, as shown in FIG. 2B(2). After ending the winding of the winding portions 311 and 312, a wire W1 can be used to electrically connect the winding portions 311 and 312. The wire W1 and the winding portions 311 and 312 can share a continuous enameled wire (i.e. after forming the winding portion 311, the enameled wire is not cut but winds continuously to form the winding portion 312 by an interval d1). Otherwise, the wire W1 can be an independent wire, two ends of which are electrically connected with the winding portions 311 and 312 respectively. The winding portions 321, 322, 331, and 332 can be formed by the similar winding method as the winding portions 311 and 312. Otherwise, the winding portions 321 and 331 can first be formed following the completion of the winding portion 311, and then the winding portions 312, 322, and 332 follows sequentially.

Figure 2C:
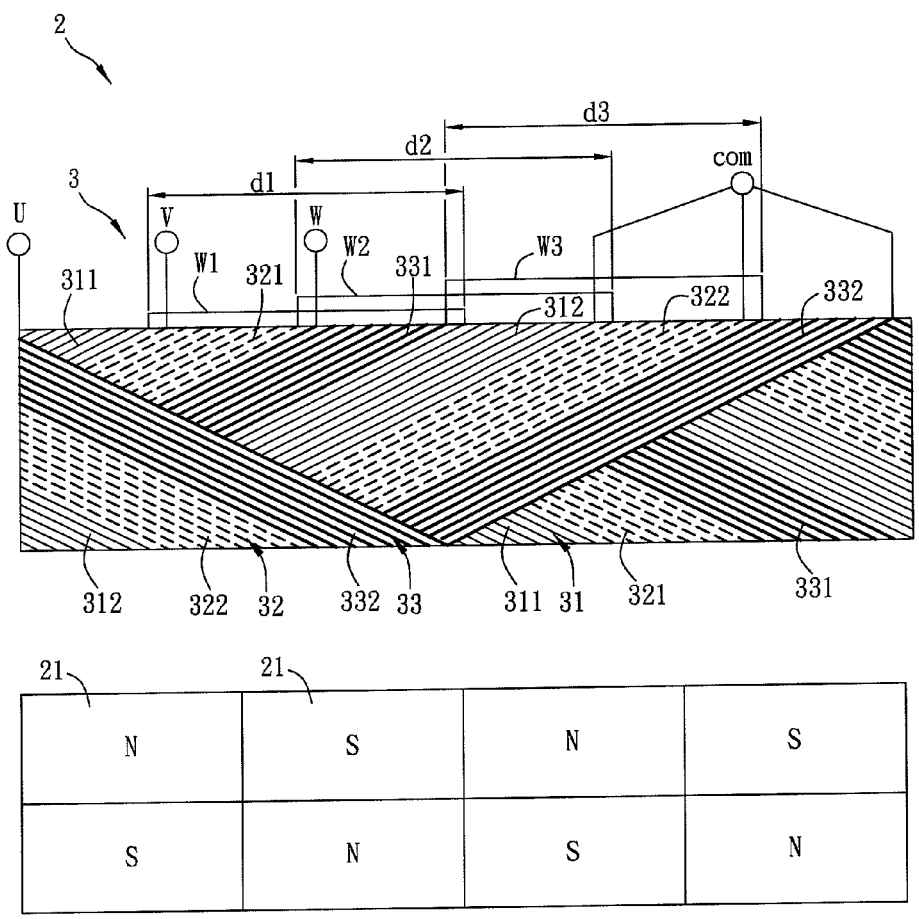
FIG. 2C is a schematic unfolded diagram of connections and magnetic materials of the coil structure of the motor in FIG. 2A.

As shown in FIG. 2C, after the windings are completed, the three winding groups 31 to 33 respectively have two winding portions 311 and 312, 321 and 322, 331 and 332, and the intervals d1, d2, and d3 respectively exist between the winding portions 311 and 312, 321 and 322, 331 and 332. Besides, the winding portions 311 and 312 are electrically connected with each other by the wire W1, the winding portions 321 and 322 are electrically connected with each other by the wire W2, and the winding portions 331 and 332 are electrically connected with each other by the wire W3. Besides, one end of each of the winding groups 31 to 33 is electrically connected to a power source, and the other ends of the winding groups 31 to 33 are electrically connected with each other. Herein, one end of each of the winding portions 311, 321, and 331 is electrically connected to a three-phase power source U, V, and W, and the other ends com of the winding portions 312, 322, and 332 are electrically connected with each other, so that the winding groups 31 to 33 of the coil structure 3 form a Y-connection.

Figure 2D:
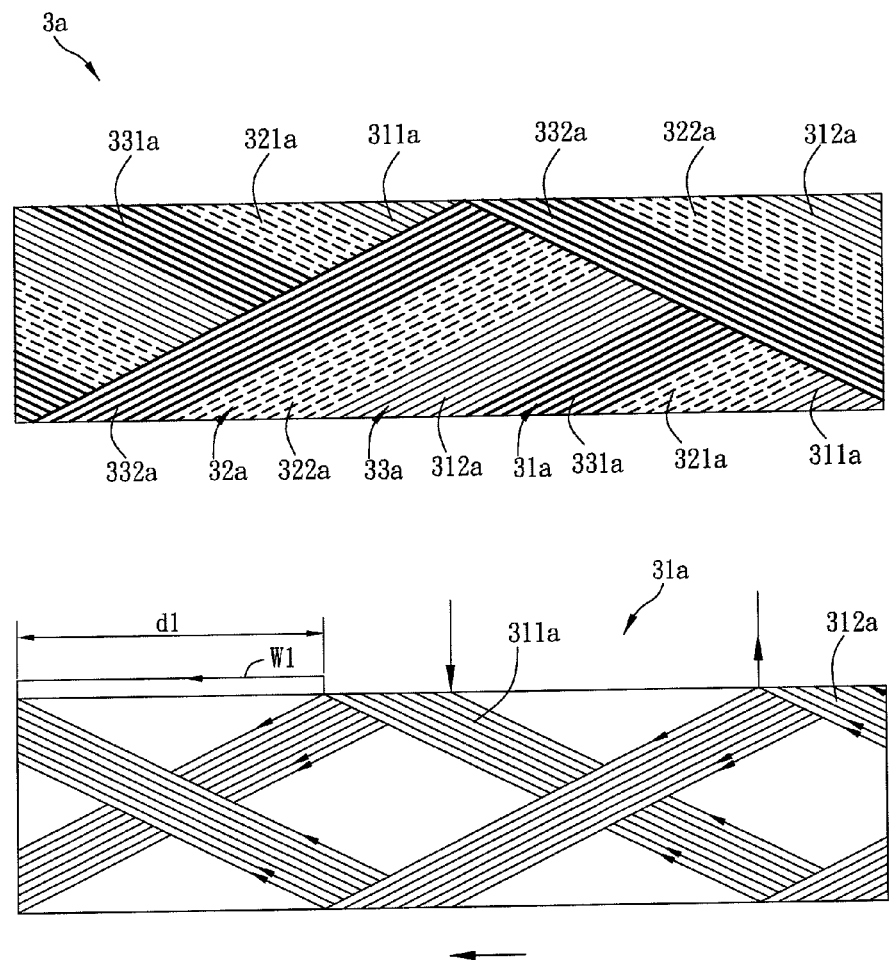
FIG. 2D is a schematic unfolded diagram of another coil structure and another winding group.

To be noted, the method of the winding towards the right direction is just for example, and the winding groups 31 to 33 of the coil structure 3 can be formed by other winding method. For example, as shown in FIG. 2D, the coil structure 3a is formed by the method of winding towards the left direction, with the winding groups 31a to 33a similar to the winding groups 31 to 33.

Referring to FIG. 2A again, a plurality of magnetic materials 21 are disposed adjacent to the coil structure 3 and corresponding to the winding groups 31 to 33. Herein, the magnetic materials 21 are disposed around a periphery of the coil structure 3 by an interval. The magnetic material 21 can be a permanent magnet.

The coil structure 3 has at least one triangle pair of a first number m. In the embodiment, as shown in FIG. 2B(4) (some oblique lines are removed for clearer illustration), the coil structure 3 has a triangle pair (the areas a, b constitute a triangle, and the area c is an inverted triangle), so the first number m is 1. Besides, each of the winding groups 31 to 33 has a plurality of winding portions of a second number n. Herein, each of the winding groups 31 to 33 has two winding portions 311 and 312, 321 and 322, 331 and 332, so the second number n is 2. In the embodiment, the number of the magnetic materials 21 of the motor 2 equals to the product of two times the first number m and the square of the second number n. That is to say, the number of the magnetic materials 21 (such as permanent magnet) equals to $2 \cdot m \times n2$, so the number of the magnetic materials 21 here equals to 8 ($2 \times 1 \times 2^2$), as shown in FIG. 2C.

Figure 3:
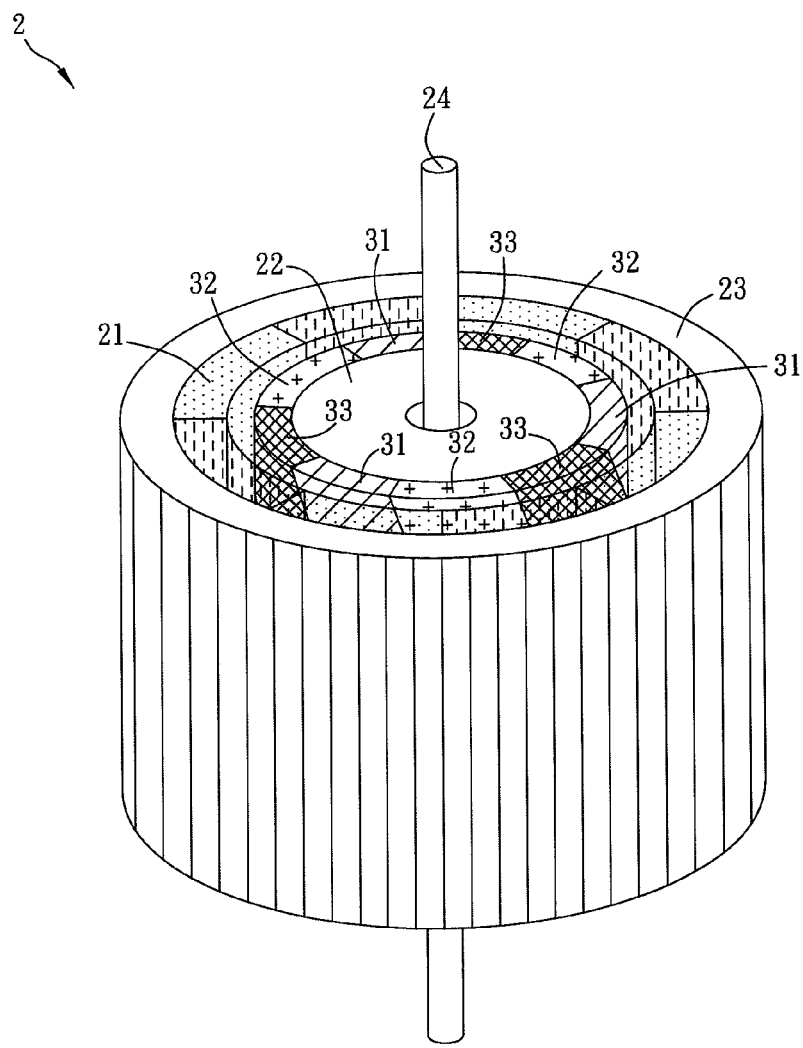
FIG. 3 is another local schematic diagram of a motor of a preferred embodiment of the invention.

FIG. 3 is another local schematic diagram of the motor 2.

As shown in FIG. 2, the motor 2 further includes a first permeance material 22, which is disposed in the coil structure 3 and connected with the coil structure 3. Herein, the first permeance material 22 is a permeance yoke iron. The coil structure 3 and the first permeance material 22 constitute the stator structure of the motor 2.

Besides, the motor 2 further includes a second permeance material 23, which is disposed around a periphery of the magnetic materials 21 and connected with the magnetic materials 21. Herein, the second permeance material 23 is also a permeance yoke iron. Besides, the motor 2 further includes a rotating shaft 24, which is connected with the second permeance material 23 and the magnetic materials 21 (not shown). The second permeance material 23, the magnetic materials 21, and the rotating shaft 24 constitute the rotor structure of the motor 2. Accordingly, when the power source inputs the electricity to the coil structure 3, the electromagnetic effect is caused between the rotor structure and the stator structure to rotate the rotor structure.

Figure 1A:
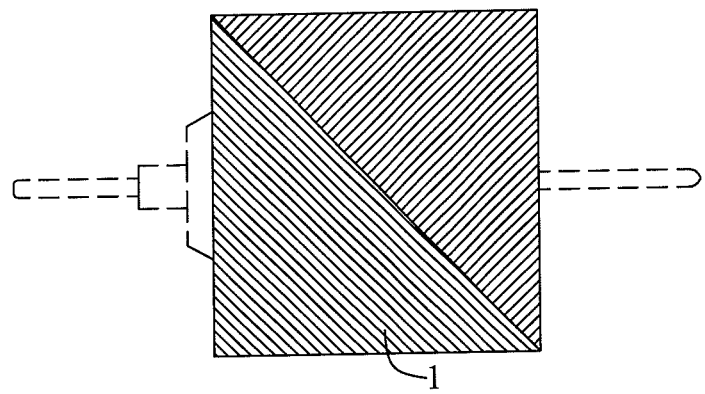
FIG. 1A is a schematic diagram of a conventional coil structure with the FaulHaber winding type.
Figure 1B:
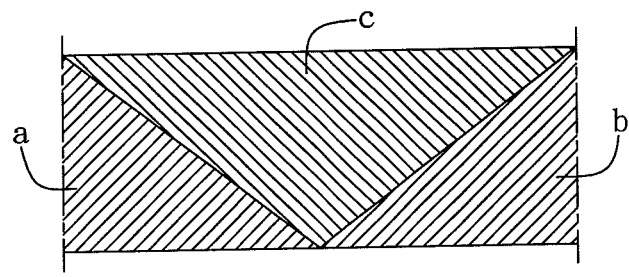
FIG. 1B is a schematic unfolded diagram of the coil structure in FIG. 1A.
Figure 1C:
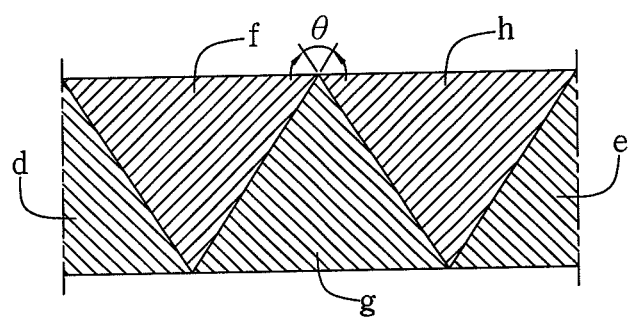
FIG. 1C is a schematic unfolded diagram of another conventional coil structure.
Figure 1D:
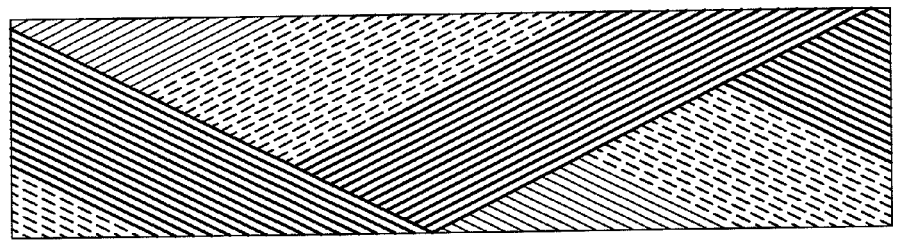
FIG. 1D is a schematic unfolded diagram of the coil structure in FIG. 1A and the corresponding magnet.
Figure 1D:
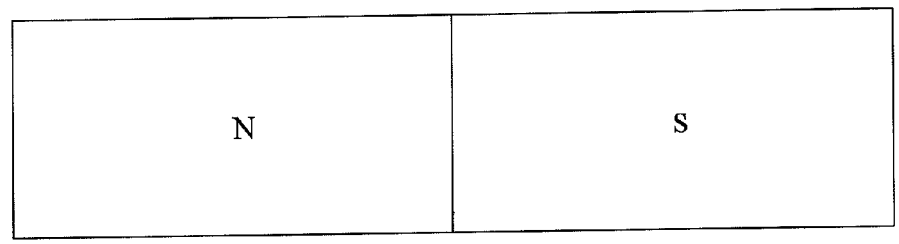

Accordingly, the motor 2 of the invention has a coil structure 3 and a plurality of magnetic materials 21. The coil structure 3 has three winding groups 31 to 33, each of which has two winding portions 311 and 312, 321 and 322, 331 and 332. The two winding portions 311 and 312, 321 and 322, 331 and 332 have an interval d1, d2, and d3 therebetween, and are electrically connected by a wire W1, W2, and W3. Besides, the magnetic materials 21 are disposed adjacent to the coil structure 3 and corresponding to the winding groups 31 to 33. Accordingly, compared with the prior art as shown in FIG. 1B, the coil structure 3 in the embodiment also has one triangle pair, and thus the bending angle θ is the same as in FIG. 1B. However, the motor 2 in the embodiment has more magnetic materials 21 (8 pieces) with the same bending angle of the enameled wire, so that the intensity of the magnetic line of force is larger and the effectiveness thereof is also enhanced. Therefore, with the same motor volume, the motor 2 in the embodiment can output more torsion and power to enhance the efficiency.

FIGS. 4A(1) and 4A(2) are respectively schematic unfolded diagrams of a motor 4 and a coil structure 5 thereof according to another preferred embodiment of the invention.

Figure 4B:
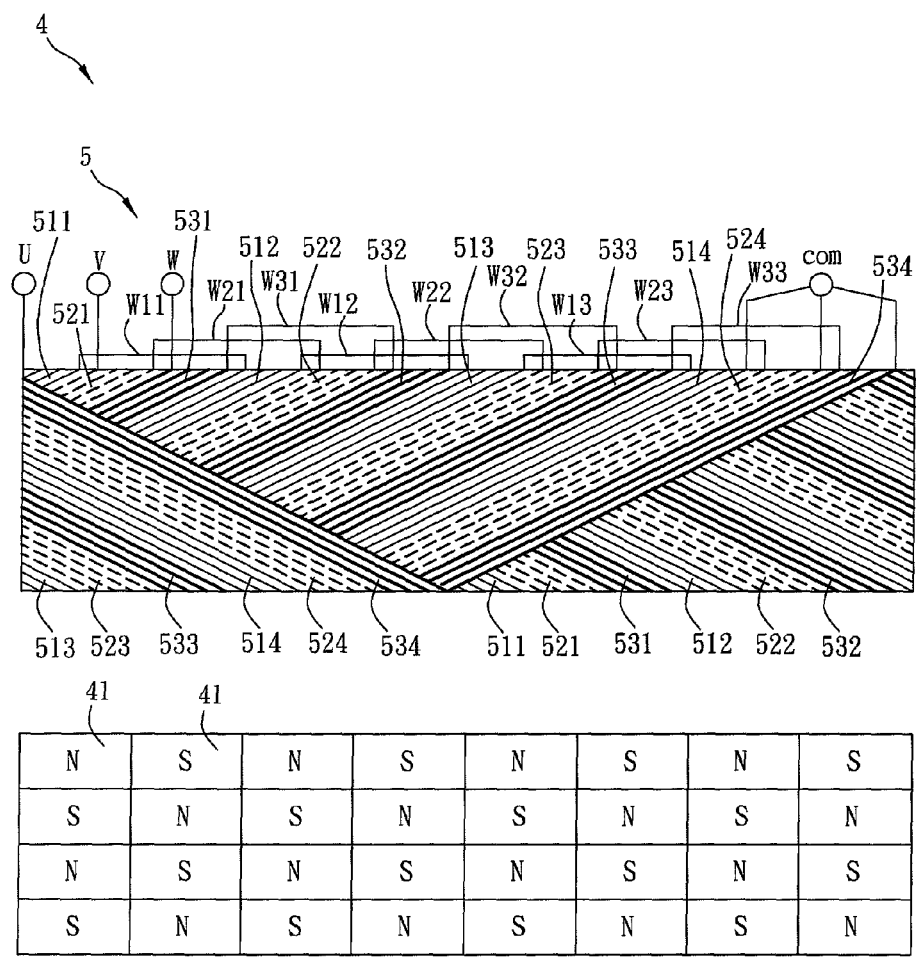
FIG. 4B is a schematic unfolded diagram of connections and magnetic materials of a coil structure of a motor of another preferred embodiment of the invention.

As shown in FIGS. 4A(1) and 4A(2), the main difference between the coil structure 5 and the coil structure 3 as mentioned above is that each of the winding group of the coil structure 5 has four winding portions 511 to 514, 521 to 524, 531 to 534, and the coil structure 5 also has one triangle pair, so the second number n is equivalent to 4, and the first number m is equivalent to 1. Therefore, as shown in FIG. 4B, the number of the magnetic materials 41 of the motor 4 is equivalent to 32 ($2 \cdot m \times n2 = 2 \times 1 \times 4^2$), i.e. 32 magnets.

Besides, as shown in FIG. 4B, the winding portions 511 to 514 are electrically connected by wires W11, W12, and W13, the winding portions 521 to 524 are electrically connected by wires W21, W22, and W23, and the winding portions 531 to 534 are electrically connected by wires W31, W32, and W33.

The other technical features of the motor 4, the coil structure 5, and the magnetic materials 41 can be perceived by referring to the motor 2, the coil structure 3, and the magnetic materials 21 as mentioned above, so the detailed descriptions are omitted here.

In summary, the motor according to the invention has a coil structure and a plurality of magnetic materials. The coil structure has three winding groups, each of which has a plurality of winding portions. The winding portions have an interval therebetween, and are electrically connected by a wire. Besides, the magnetic materials are disposed adjacent to the coil structure and corresponding to the winding groups. Accordingly, compared with the prior art, the coil structure of the invention has at least one triangle pair as many as the prior art, and thus the bending angle of the winding is the same as the prior art. However, the motor of the invention has more magnetic materials (permanent magnet) with the same bending angle of the enameled wire, so that the density of the magnetic field lines is higher and the effectiveness thereof is also enhanced. Therefore, with the same motor volume, the motor of the invention can output more torsion and power to enhance the motor efficiency.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A motor, comprising:
   a coil structure, including three winding groups, each of which has a plurality of winding portions, wherein the winding portions have an interval therebetween, and are electrically connected by a wire; and
   a plurality of permanent magnets, disposed adjacent to the coil structure and corresponding to the winding groups, wherein the coil structure has only one triangular pair equal to a first number and the first number is equal to one, and the triangular pair is constituted by a triangle and an inverted triangle, each of the winding groups has the number of winding portions equal to a second number, and the number of the permanent magnets is equal to the product of two times the first number and the square of the second number.

2. The motor as recited in claim 1, wherein the coil structure is a hollow coil.

3. The motor as recited in claim 1, wherein the coil structure is formed by the FaulElaber winding method.

4. The motor as recited in claim 1, wherein the winding groups are formed sequentially, and they have the same winding procedure and structure.

5. The motor as recited in claim I, further comprising:
   a first permeance material, disposed in the coil structure and connected with the coil structure.

6. The motor as recited in claim 1, further comprising: a second permeance material, disposed around a periphery of the permanent magnets.

7. The motor as recited in claim 1, wherein an end of each of the winding groups is electrically connected to a power source, and the other ends of the winding groups are electrically connected with each other.

8. A coil structure applied to a plurality of permanent magnets, comprising:
- a plurality of winding groups, each of which has a plurality of winding portions, wherein the winding portions have an interval therebetween, and are electrically connected by a wire,
- wherein the coil structure has only one triangular pair equal to a first number and the first number is equal to one, and the triangular pair is constituted by a triangle and an inverted triangle, each of the winding groups has the number of winding portions equal to a second number, and the number of the permanent magnets is equal to the product of two times the first number and the square of the second number.

9. The coil structure as recited in claim 8, wherein the coil structure is a hollow coil.

10. The coil structure as recited in claim 8, wherein the coil structure is formed by the FaulHaher winding method.

11. The coil structure as recited in claim 8, wherein the winding groups are formed sequentially, and they have the same winding procedure and structure.

* * * * *